United States Patent [19]

Cope

[11] Patent Number: 4,904,086

[45] Date of Patent: Feb. 27, 1990

[54] LIGHT ALIGNMENT DETECTION DEVICE

[75] Inventor: Paul E. G. Cope, Fareham, England

[73] Assignee: The Marconi Company Limited, England

[21] Appl. No.: 293,933

[22] Filed: Jan. 5, 1989

[30] Foreign Application Priority Data

Jan. 8, 1988 [GB] United Kingdom ................. 8800368

[51] Int. Cl.⁴ .............................................. G01B 11/00
[52] U.S. Cl. ................................ 356/400; 250/203 R; 356/152; 356/153
[58] Field of Search ............... 356/152, 153, 399, 400; 250/201, 203 R

[56] References Cited

U.S. PATENT DOCUMENTS 3,133,200  5/1964  Collyer ........................... 250/203 R Primary Examiner—F. L. Evans
Attorney, Agent, or Firm—Kirschstein, Ottinger, Israel & Schiffmiller

[57] ABSTRACT

An optical alignment detector uses a Fresnel bi-prism (12) on the base of which an incoming beam of light is focussed. When the beam is in alignment, it strikes the base substantially normally and is brought to a focus adjacent a ridge (13) of the bi-prism (12). To cope with a second axis of alignment, a second bi-prism (14) having a ridge (15) is placed beneath the first, with the two ridges (13,15) arranged orthogonally so as to produce four possible pupil entrance images which can be received by four photodetectors (17,18,19,20).

5 Claims, 1 Drawing Sheet

U.S. Patent     Feb. 27, 1990     4,904,086
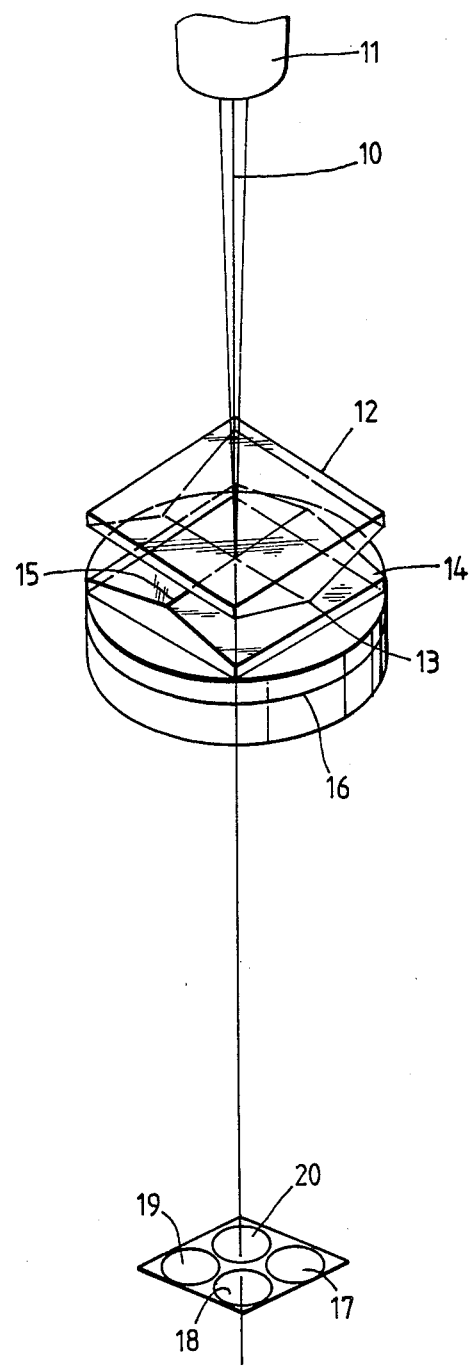

LIGHT ALIGNMENT DETECTION DEVICE

BACKGROUND OF THE INVENTION

1. Field of the Invention

The present invention concerns a light alignment detection device. One field in which such a device finds application is that of communication with a satellite. Thus one satellite may have a laser transponder emitting a beam of light which is to be picked up by a second satellite or a ground station. Alternatively the light source could be earth-based. It will be appreciated that for the purpose of this specification the term light is not limited to visible light but includes electro-magnetic radiation extending on either side of the visible spectrum.

2. Description of Related Art

It is frequently extremely important that the emitted beam of light is accurately aligned with the optical axis of the receiving device. It is already known to use light alignment detection devices comprising a telescope associated with a detector system which captures the light beam provided it lies within a particular field aperture, the detector then providing output signals indicating the degree of misalignment of the captured beam. These signals can then be used either to alter the attitude of the emitting satellite or of the detecting device to ensure correct beam alignment. Detection devices used for this purpose have included large area coupled charge devices, CCD detectors, large area quadrant PIN diodes or small area PIN ar APD detectors in combination with mechanical scanning. All these known devices are relatively complex and bulky.

SUMMARY OF THE INVENTION

The present invention has for an object to provide light beam detector apparatus capable of covering a relatively large field or angular uncertainty whilst using fixed detectors of relatively modest area.

Accordingly the present invention consists in an optical alignement detector device comprising means for focussing an incoming beam of light, a Fresnel bi-prism mounted with its base towards the focussing means such that when the beam is in alignment with the optical axis of the focussing means the beam strikes the base substantially normally and is brought to a focus adjacent the ridge of bi-prism, and a pair of photodetectors disposed to receive light transmitted through the prism and located on either side of the plane containing the ridge of the bi-prism.

Preferably there is a second bi-prism mounted beneath the first prism, the second bi-prism having the length of its ridge disposed orthogonally with respect to the ridge of the first bi-prism and being converted with respect to the first bi-prism, the arrangement being such that an out-of-alignment input beam generates one to four displaced entrance pupil images. This arrangement may include a field lens mounted in the optical path after the two bi-prisms so that the or each entrance pupil image lies in its focal plane, the arrangement further including four photodetectors mounted so that each one covers one of the four possible entrance pupil images as focused by the field lens.

BRIEF DESCRIPTION OF THE DRAWING

In order that the present invention may be more readily understood an embodiment of a light alignment detector device constructed in accordance with the invention will now be described by way of example and with reference to the single FIGURE of the accompanying drawing.

DETAILED DESCRIPTION OF THE PREFERRED EMBODIMENT

Referring now to the drawing this shows a convergent input beam 10 originating from a simple compound telescope indicated at 11. The light may be generated by a suitable laser. As already stated, the device is primarily intended for use in satellite communication. However it will be appreciated that there are many other potential applications. For a satellite application the telescope should have a numerical aperture in the region of f/16.

The input beam 10 falls approximately normally on the flat base of a Fresnel bi-prism 12 and is arranged to come to a focus close to the ridge 13 of this bi-prism.

A second Fresnel bi-prism 14 is mounted beneath prism 12 and is inverted so that its ridge 15 lies close to the focal plane of the telescope but orthogonally to the ridge of prism 12. After passing through both bi-prisms 12, 14 the light is refocussed by a field lens 16. This lens, in the absence of the two prisms, would form on the optical axis a reduced image of the telescope entrance pupil.

It will be appreciated that if the telescope is directly aligned with the emitting light source then the focal point of the beam 10 should lie on the cross point of the ridges of the two prisms. However deviation of the light beam from this alignment axis will mean that the light will appear as one or more of four displaced entrance pupil images in the focal plane of field lens 16. An array of four photodetectors 17, 18, 19 or 20 is arranged so that one of each of the photodetectors will cover one of these displaced entrance pupil images.

When the incoming light beam is aligned such that the circle of least confusion or Airy disc is split across one or both of the prism ridges this results in an approximately proportional transfer of illumination between the photodetectors. This gives the device a very high slope of photocurrent versus misalignment.

This high slope is advantageous in that it minimises the noise angle equivalent to a given level of electrical noise in the detector amplifier. This slope is limited only by the diffraction limit of the telescope primary.

The outputs of the four photodetectors are amplified and taken to a network of comparator circuits so that this distribution of intensity of the light beam over the four photodetectors can be compared and the differences translated into an error signal which can be and, if required, to adjust the alignment of the telescope until the transmitted light beam lies directly along the optical axis of the telescope.

Whilst the precding description has been in the context of a satellite environment it will be appreciated that it is applicable to many other situations where the location of a light beam is to be determined. Where the possible angular deviation is limited to an arc the plane of which is known it is possible to dispense with the lower Fresnel bi-prism and two of the four photodetectors.

I claim:

1. An optical alignment detector device comprising: means for focussing an incoming beam of light, a Fresnel bi-prism mounted with its base towards the focussing means such that when the beam is in alignment with the optical axis of the focussing means the beam strikes the base substantially normally and is brought to a focus adjacent the ridge of bi-prism, and a pair of photodetectors disposed to receive light transmitted through the prism and located on either side of the plane containing the ridge of the bi-prism.

2. A device as claimed is claim 1 wherein there is a second bi-prism mounted beneath the first prism, the second bi-prism having the length of its ridge disposed orthogonally with respect to the ridge of the first bi-prism and being inverted with respect to the first bi-prism, the arrangement being such that an out-of-alignment input beam generates one to four displaced entrance pupil images.

3. A device as claimed in claim 2 wherein a field lens is mounted in the optical path after the two bi-prisms so that the or each entrance pupil image lies in its focal plane, the arrangement further including four photodetectors mounted so that each one covers one of the four possible entrance pupil images as focussed by the field lens.

4. A device as claimed in claim 1 wherein the means for focusing an incoming beam of light comprises a simple compound telescope.

5. A device as claimed in claim 4 wherein the telescope has a numerical aperture of approximately F/16.

* * * * *